(12) United States Patent
Ozawa

(10) Patent No.: US 6,676,197 B2
(45) Date of Patent: Jan. 13, 2004

(54) FRONT BODY STRUCTURE FOR VEHICLE

(75) Inventor: Hiroshi Ozawa, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 12 days.

(21) Appl. No.: 10/145,904

(22) Filed: May 16, 2002

(65) Prior Publication Data

US 2002/0171262 A1 Nov. 21, 2002

(30) Foreign Application Priority Data

May 18, 2001 (JP) ........................................ 2001-149580

(51) Int. Cl.⁷ ............................................... B60R 27/00
(52) U.S. Cl. ............................. 296/187.03; 296/187.04
(58) Field of Search ..................... 296/187.04, 187.03, 296/193.09, 193.11, 198

(56) References Cited

U.S. PATENT DOCUMENTS

| | | | | |
|---|---|---|---|---|
| 5,429,412 A | * | 7/1995 | Schoen et al. | 296/191 |
| 5,466,033 A | * | 11/1995 | Murakami et al. | 296/187.09 |
| 5,466,035 A | * | 11/1995 | Klages et al. | 296/187.09 |
| 5,482,348 A | * | 1/1996 | Mass et al. | 296/207 |
| 5,988,305 A | * | 11/1999 | Sakai et al. | 296/187.04 |
| 6,547,316 B2 | * | 4/2003 | Chung | 296/187.03 |

FOREIGN PATENT DOCUMENTS

| | | | | | |
|---|---|---|---|---|---|
| JP | 01197182 A | * | 8/1989 | | 296/198 |
| JP | 11-180350 | | 7/1999 | | |
| JP | 11-198861 | | 7/1999 | | |
| JP | 11-321717 | | 11/1999 | | |
| JP | 2000-108841 | | 4/2000 | | |
| JP | 2000-280859 | | 10/2000 | | |

* cited by examiner

*Primary Examiner*—Stephen T. Gordon
*Assistant Examiner*—Lori L. Coletta
(74) *Attorney, Agent, or Firm*—Smith, Gambrell & Russell, LLP

(57) ABSTRACT

A vertical wall formed by bending a front fender toward an engine room is connected with a front wheel apron through a supporting bracket. The supporting bracket is shaped into a U-channel configuration opening downwardly. In which, a front fender side vertical wall is formed on the front fender and an engine room side vertical wall is formed on the engine room side in such a manner as partitioning the front fender side vertical wall off. The front fender side vertical wall is secured at a lower end thereof to the front wheel apron. When an impact load is applied from above the neighborhood of the boundary between the front fender and engine room, a middle section shaped into arch of the front fender side vertical wall and a hole section provided on the front fender side vertical wall collapse to absorb the impact energy.

6 Claims, 6 Drawing Sheets

FRONT BODY STRUCTURE FOR VEHICLE

BACKGROUND OF THE INVENTION

1. Field of the Invention

The present invention relates to a structure of a front part of a vehicle body and more particularly to a front body structure easy to absorb an impact load applied from above.

2. Discussion of Prior Art

Generally, the front body structure comprises a front wheel apron constituting a side wall of an engine room, a front fender extending from the front wheel apron upwardly and then extending outwardly and an engine hood for opening and closing a space laterally connecting left and right front fenders, that is, the upper opening of the engine room.

When a pedestrian collides with a front part of a vehicle, his or her legs are pushed upwards and the upper part of the body is thrown up. As a result, the upper part of the body falls upon the engine hood. At this moment, the head of the pedestrian hits the upper wall of the front fender or the neighborhood of a boundary of the upper wall of the front fender and the engine hood to deform the outer edge of the engine hood or the vertical wall of the front fender. As a result, the impact energy is absorbed and the pedestrian's head is protected.

Japanese Patent Application Laid-open No. Toku-Kai-Hei 11-180350 discloses a technology in which as shown in FIG. 5 of Toku Kai Hei reference, a flange is formed at the lower end of a vertical wall that is formed on the inner side of a front fender, the flange is connected at front and rear ends thereof with the upper surface of a front wheel apron and an arch is formed at a longitudinally middle portion of the flange so that when the front fender has an impact from above, the arch deforms downwardly to reduce a head impact of a pedestrian.

However, the technology described above has an disadvantage that since the vertical wall absorbing an impact energy is integrally molded with the front fender, the bending depth of the front fender is so large that the stamping process of the front fender becomes complicated. Further, since the arch opens on the engine room side, it is necessary to apply trimming to the edge of the arch and processing man-hours increase. Furthermore, since the front fender is fully exposed to view from the engine room through the arch, this is an aethetic problem. On the other hand, closing the arch with other members is not preferable because of the increased number of components and increased man-hours.

Further, since the vertical wall for absorbing impact energy is integrally formed with the front fender, in order to reduce HIC (Head injury Criterion), it is difficult to change the configuration of the vertical wall or to cut away excess metal from the vertical wail.

Further, in case where holes are provided with the vertical wall in order to reduce HIC, these holes must be concealed from view of the inside of the front fender through the holes, this leading to an increase of manufacturing cost.

SUMMARY OF THE INVENTION

It is an object of the present invention to provide a front body structure for a vehicle capable of easily forming a front fender and reducing a magnitude of head impact.

To attain the object, in a front body structure of a vehicle having a front wheel apron constituting a side wall of an engine room and an upper surface connected with a front fender through a supporting bracket extending in a lengthwise direction of a vehicle, the supporting bracket comprises an upper mounting surface on which the front fender is mounted, an engine room side vertical wall downwardly extending from a widthwise inner edge of the upper mounting surface, a front fender side vertical wall downwardly extending from a widthwise outer edge of the upper mounting surface and an impact absorbing means provided on the front fender side vertical wall for absorbing an impact load from above. The impact absorbing means includes an arch-shaped flange section and at least one hole section provided in the vicinity of a connecting portion of the supporting bracket and the upper surface of the front wheel apron.

Further, the front body structure comprises an engine hood outer panel, an engine hood inner panel forming a hut-shaped closed cross section with the engine hood outer panel, a first convex section provided along the hut-shaped engine hood inner panel, a second convex section provided adjacent to and outside of the first convex section along the hut-shaped engine hood inner panel and a fold line section provided on the hut-shaped engine hood inner panel in a lengthwise direction of the vehicle between the first convex section and the second convex section so that the engine hood inner panel is easily bent around the fold line toward the engine hood outer panel when an impact load is applied to the engine hood outer panel.

DESCRIPTION OF THE PREFERRED EMBODIMENT

Figure 1:
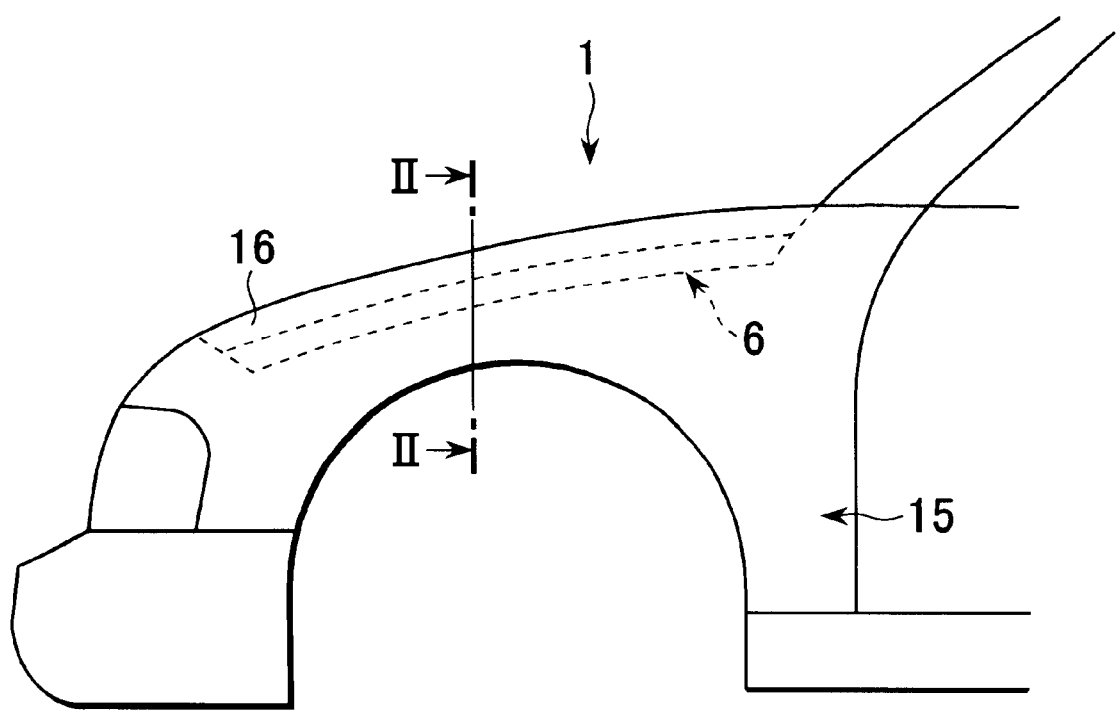
FIG. 1 is a side view showing a front part of a vehicle body according to a first embodiment.

Referring to FIGS. 1 to 5, a front body section 1 has a front wheel apron 4 including a vertical wall 3 constituting left and right respective inner walls of an engine room 2. The wheel apron 4 extends in a lengthwise direction of a vehicle and a supporting bracket 6 is secured to an upper mounting surface 5 of the front wheel apron 4.

The supporting bracket 6 has a fender bracket mounting surface 7 on the upper surface thereof. An engine room side vertical wall 8 downwardly extends from an inner end of the fender bracket mounting surface 7 and a front fender side vertical wall 9 downwardly extends from an outer end thereof to form a U-channel.

These vertical walls 8, 9 extend along the front wheel apron 4 in a lengthwise direction of the vehicle. Further, the engine room side vertical wall 8 is almost flush with the vertical wall 3 of the front wheel apron 4. Further, the lower edge of the front fender side vertical wall 9 is bent outwardly in a widthwise direction to form a flange section 10.

Figure 3:
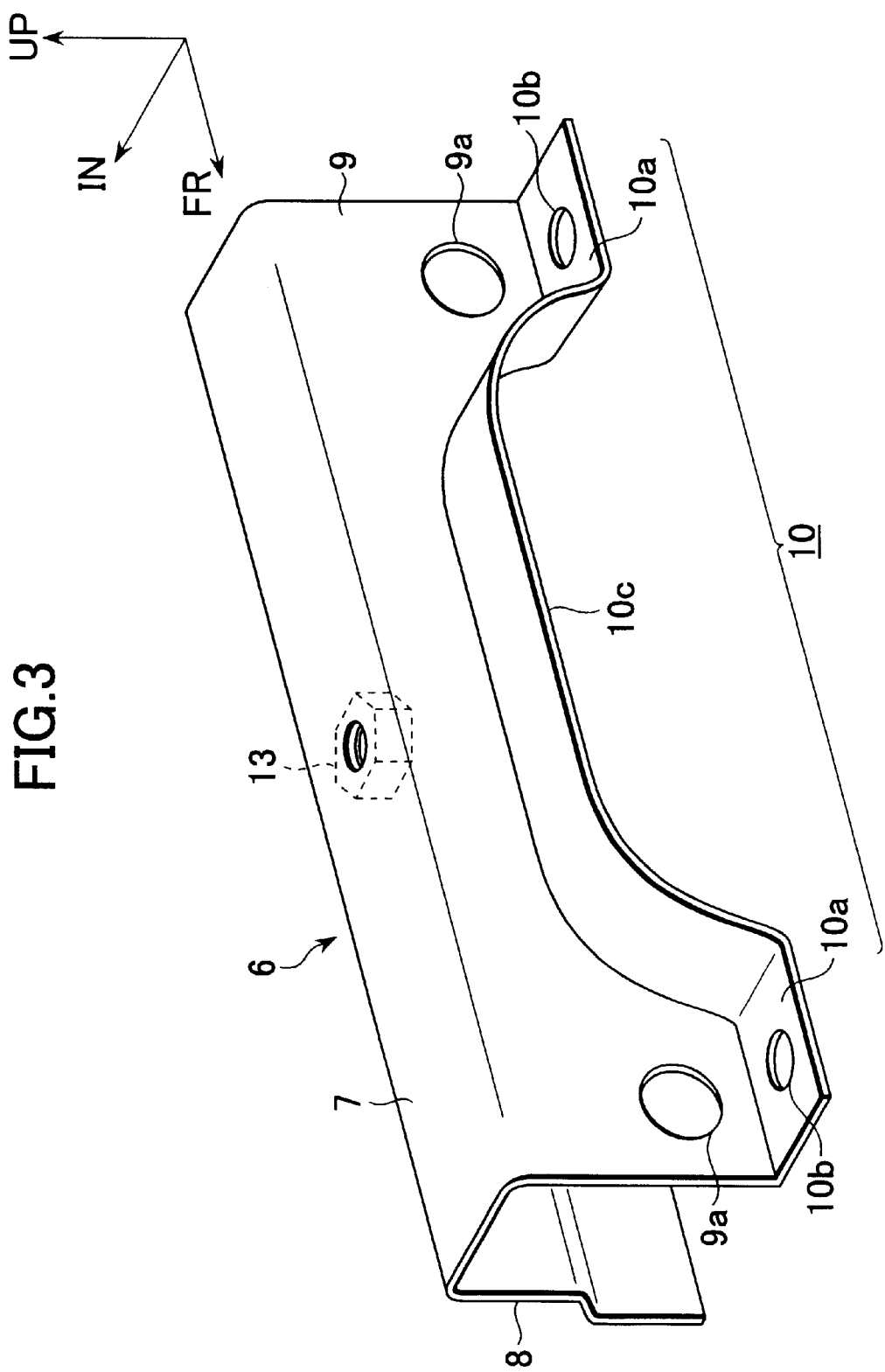
FIG. 3 is a perspective view of a bracket.

As shown in FIG. 3, a contact surface 10a secured to the upper mounting surface 5 of the front wheel apron 4 is formed at front and rear ends of the flange section 10 of the supporting bracket 6 respectively. The supporting bracket 6 is secured to the upper mounting surface 5 by a bolt 12 passing through a bolt hole 10b provided on the contact surface 10a and a nut 13 welded to the undersurface of the upper mounting surface 5 and forms a substantially large space on the upper mounting surface 5. Further, a middle section 10c of the flange section 10 is shaped into arch and is apart from the upper mounting surface 5. Further, a hole section 9a is provided on the front fender side vertical wall 9 in the vicinity of the contact surface 10a and this hole section 9a acts as a yieldable portion. The arch-shaped middle section 10c and the hole section 9a form an impact absorbing means for downwardly deforming the front fender side vertical wall 9 when an impact load is applied from above. Further, a nut 13 is welded to the inner surface of the middle part of the fender bracket mounting surface 7.

Reference numeral 15 denotes a front fender extending in a lengthwise direction of the vehicle. The front fender 15 comprises a vertical wall 16 extending downwardly on an inner side thereof and an external wall 19 extending downwardly on an outer side thereof. The lower edge of the vertical wall 16 is bent inside in a direction of the engine room 2 to form a mounting flange 17. The mounting flange 17 is secured to the fender bracket mounting surface 7 by threading a bolt 12 onto the welded nut 13.

The top surface of the engine room 2 is closed by an engine hood 21 comprising a hood outer panel 22 and a hood inner panel 23 and hingedly connected with the body. The hood outer panel 22 constitutes a body external surface and the hood inner panel 23 is disposed inside of the hood outer panel 22 along a periphery edge thereof, constituting a skeleton of the engine hood 21.

Figure 2:
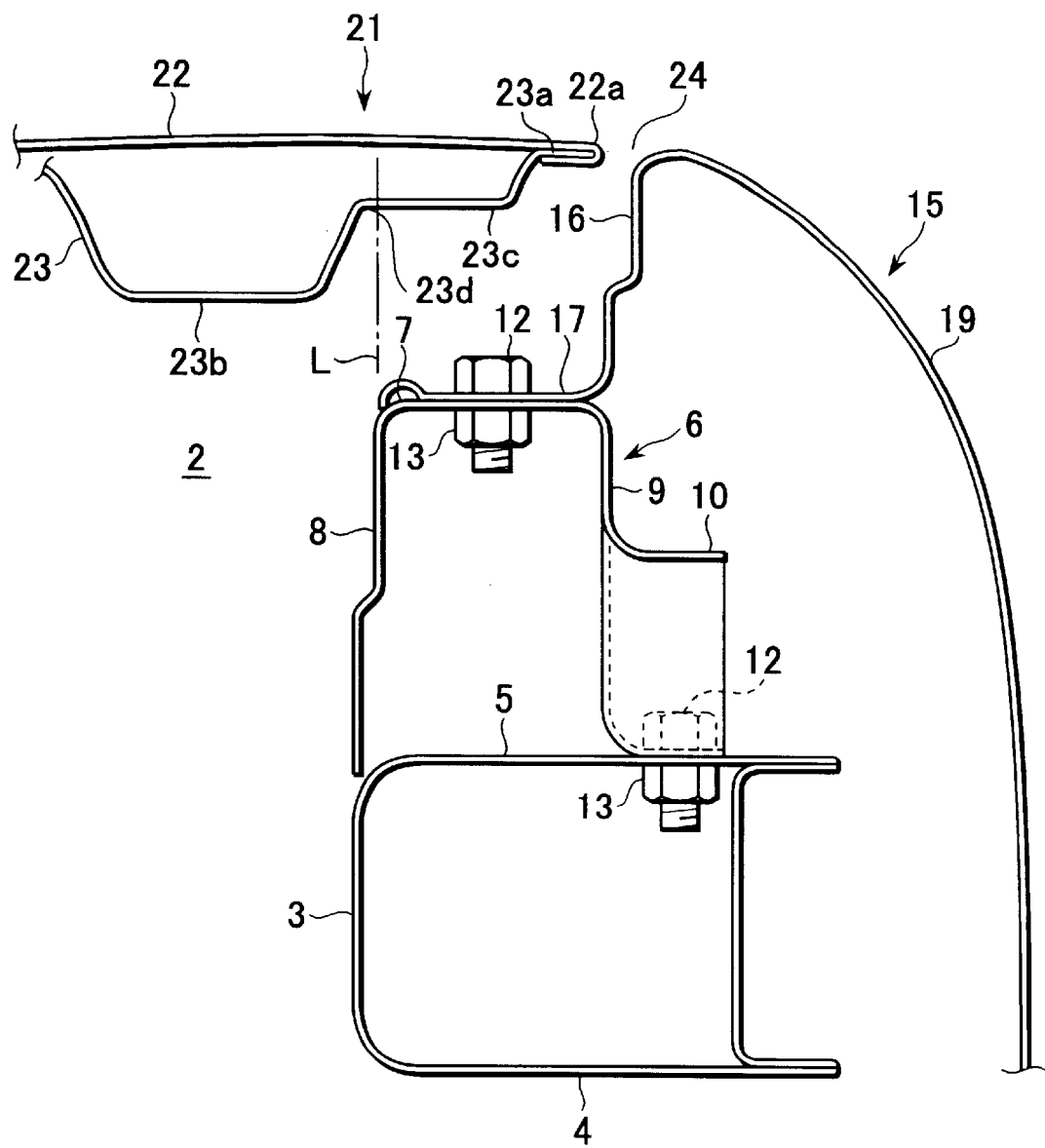
FIG. 2 is a cross sectional view taken along a line II—II of FIG. 1.

As shown in FIG. 2, the hood inner panel 23 has a hut-shaped closed cross section closed by the hood outer panel 22, forming an outer flange 23a at an upper edge thereof. The outer flange 23a is connected with an outer periphery edge 22a of the hood outer panel 22 through hemming. On the other hand, the hood inner panel 23 has an inner flange (not shown) at the upper edge the opening thereof and the inner flange is spot-welded to the hood outer panel 22.

A first convex section 23b protruded toward the engine room 2 is formed along the hut-shaped hood inner panel 23 in the neighborhood of a boundary part 24 between the engine hood 21 and the front fender 15. Also, a second convex section 23c lower than the fist convex section 23b is formed along the hut-shaped hood inner panel 23 adjacently on the side of the boundary part 24. Accordingly, a level difference or a leading edge section is formed between the fist and second convex sections 23b, 23c. That is, a fold line section 23d is formed at the foot of the leading edge section. This fold line section 23d is disposed on a slightly inner side with respect to an extension line L of the engine room side vertical wall 8 and the vertical wall 3 of the front wheel apron 4 when viewed from a longitudinal direction of the vehicle.

Figure 4:
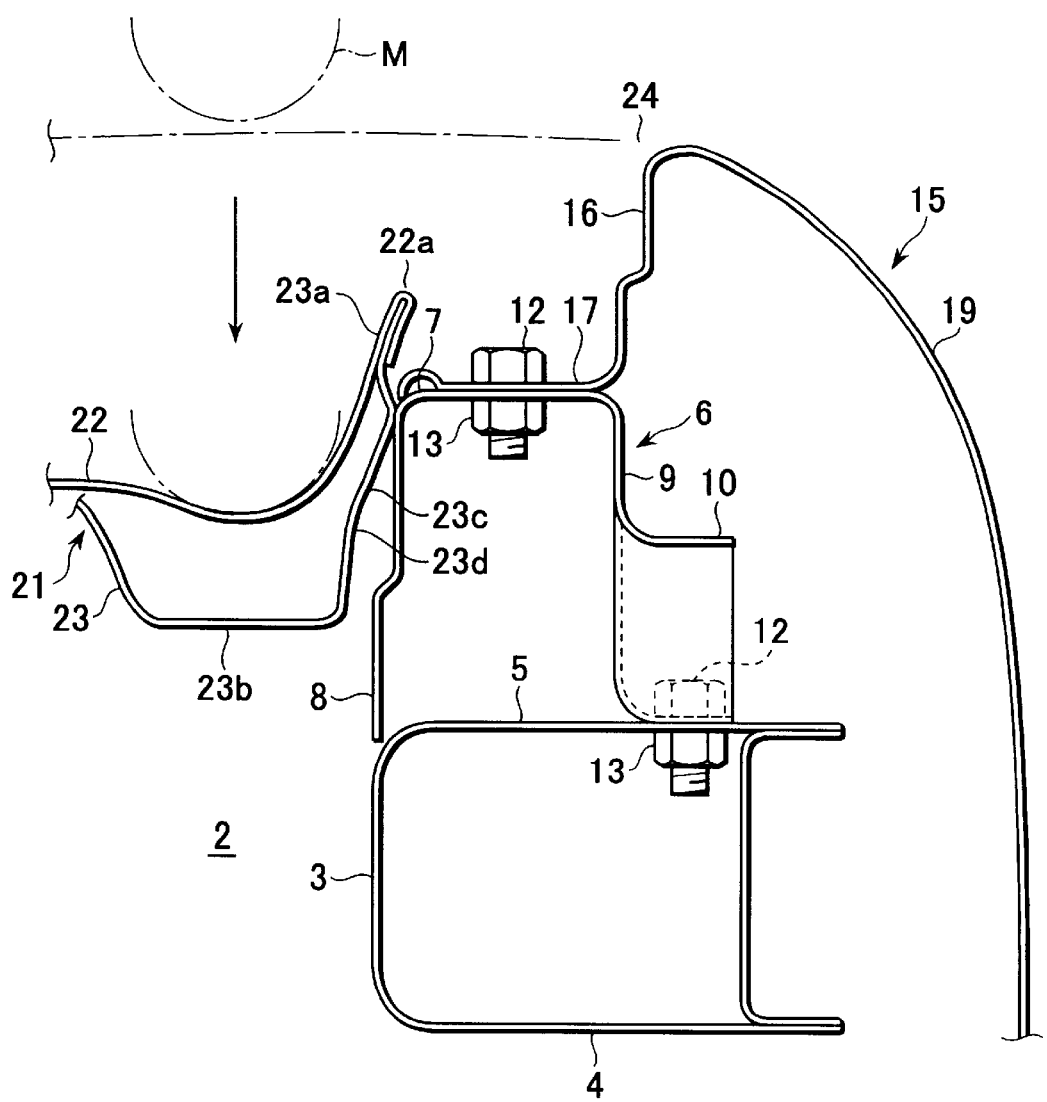
FIG. 4 is a cross sectional view taken along a line II—II of FIG. 1 when an impact load is applied to an engine hood.

As shown in FIG. 4, in thus constituted front body structure, when a head impactor M is dropped from above a slightly inside of the boundary part 24 between the engine hood 21 and the front fender 15, the hood outer panel 22 is partially deformed along the external configuration of the head impactor M and as a result an initial reaction force increases. After that, the hood outer panel 22 starts sinking over a wide range due to the inertia force of the head impactor M. The reaction force received from the hood outer panel 22 gradually decreases. Then, the second convex section 23c of the hood inner panel 23 collides with the fender bracket mounting surface 7 of the supporting bracket 6.

At this moment, since the fold line section 23d of the hood inner panel 23 is established on the inner side of an extension line L and the distance between the second convex section 23c and the hood outer panel 22 is smaller than that between the first convex section 23b and the hood outer panel 22, the second convex section 23c receives a strong reaction force from the supporting bracket 6. As a result, as shown in FIG. 4, the fold line section 23d is deformed in an unfolded manner, thus a required second order reaction force being obtained without increasing the HIC value.

After that, an impact energy is completely absorbed by the second convex section 23c sliding on a ridge section between the fender bracket mounting surface 7 and the engine room side vertical wall 8 and sinking downward. Further, since the first convex section 23b can travels downward up to an adequate depth without interfering with the vertical wall 3 of the front wheel apron 4, the engine hood 21 can secure a required impact absorbing stroke when an impact load is applied from above the first convex section 23b. As a result, the HIC value is effectively reduced and a magnitude of head impact can be decreased.

Figure 5:
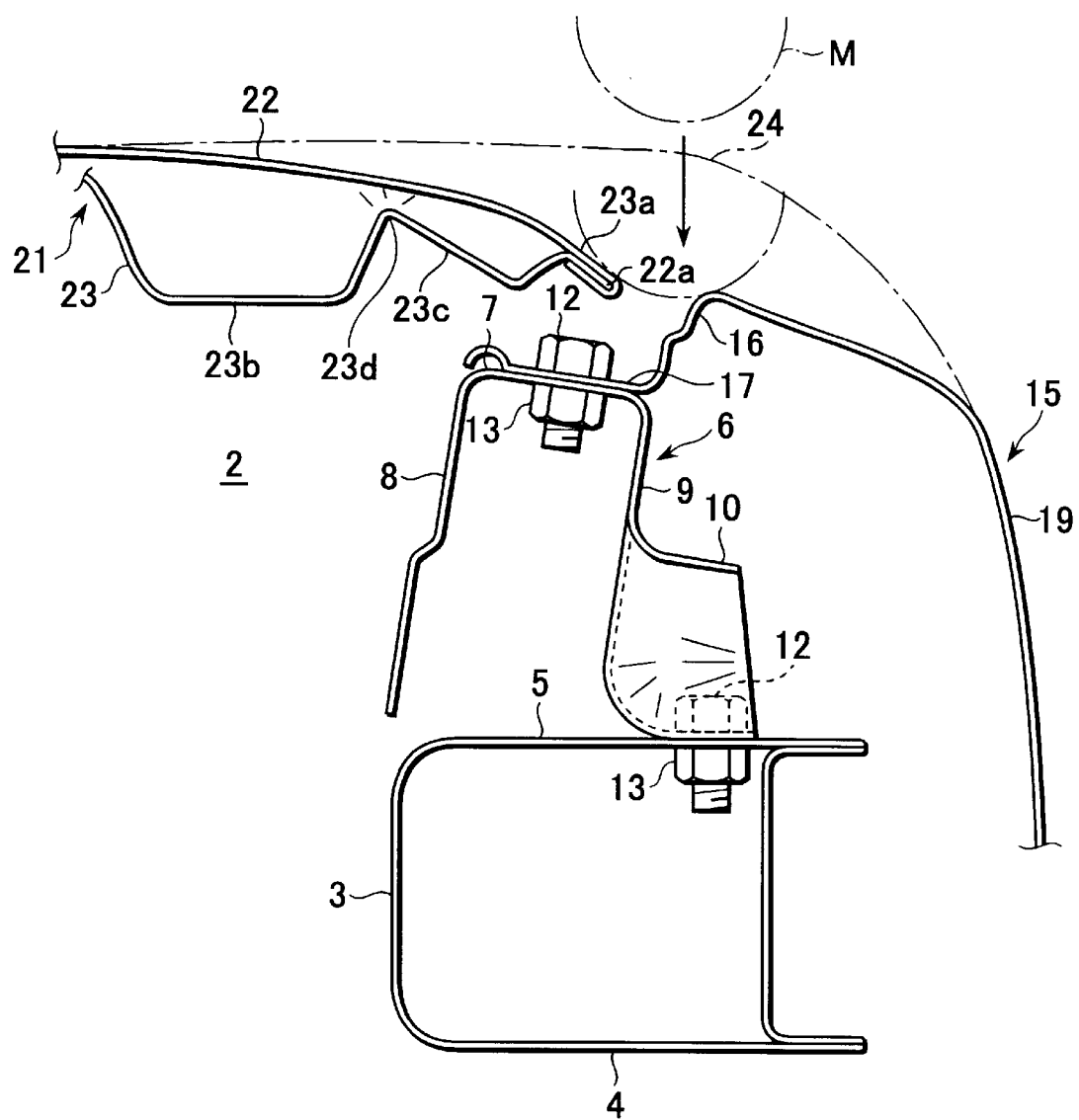
FIG. 5 is a cross sectional view taken along a line II—II of FIG. 1 when an impact load is applied to the neighborhood of a boundary between an engine hood and a front fender.

As shown in FIG. 5, when a head impactor M is dropped from above the neighborhood of the boundary part 24 between the engine hood 21 and the front fender 15, an impact load is applied to both of the engine hood 21 and the front fender 15. Then, the edge of the hood outer panel 22 and the upper end of the front fender 15 are locally deformed and an initial reaction force increases. An inertia force of the head impactor M causes a wide range of sinking and as a result the reaction force gradually decreases.

After that, the engine hood 21 starts deforming in an acute angle direction around the fold line section 23d. On the other hand, the impact load applied to the front fender 15 is transmitted to the supporting bracket 6 via the vertical wall 16. Since the middle section 10c is shaped into arch and is apart from the upper mounting surface 5 of the front wheel apron 4, when an impact load is applied from above the middle section 10c, the middle section 10c mainly receives the impact load and starts deforming in a collapsing manner. Further, since the hole section 9a is provided on the front fender side vertical wall 9 above the contact surface 10a of the supporting bracket 6, the front fender side vertical wall 9 deforms mainly around the hole section 9a and as a result the deformation of the engine hood 21 and supporting bracket 6 produces a desired second order reaction force.

Further, the plastic deformation of the engine hood 21 and supporting bracket 6 provides a complete absorption of impact energy. As a result, also when the head impactor M is dropped from above the neighborhood of the boundary part 24 between the engine hood 21 and the front fender 15 and an impact load is applied, a head impact can be reduced effectively. In this case, the HIC value can be reduced more by changing the distance of the middle section 10c from the upper mounting surface 5 of the front wheel apron 4 or by changing the size, configuration, number of the hole sections 9a provided on the front fender side vertical wall 9.

According to the present invention, since the engine room side vertical wall 8 is disposes opposite to the front fender side vertical wall 9, the engine room side vertical wall 8 acts as preventing the front fender side from being exposed to view from the engine room 2. Accordingly, the arch-shaped middle section 10c and the hole section 9a can be freely designed in careful consideration of the HIC value.

Further, since the engine room side vertical wall 8 serves as an insulator for preventing noises of the engine room 2 from being transferred to a passenger compartment through the front fender 15, the passenger compartment can be kept quiet. Further, since the engine room side vertical wall 8 is integrally formed with the supporting bracket 6, the number of components can be reduced, this leading to the reduction of manufacturing cost.

Figure 6:
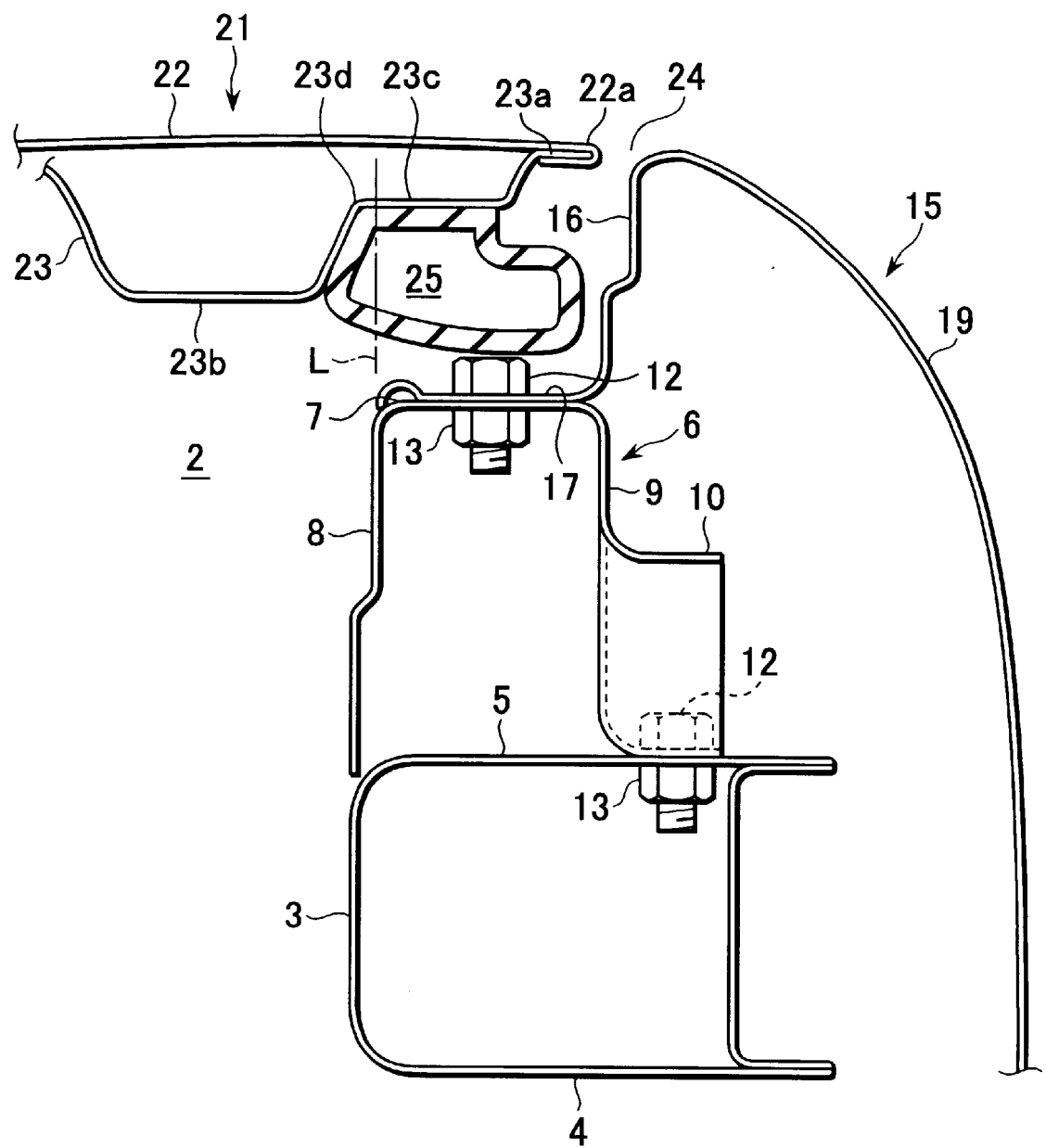
FIG. 6 is a cross sectional view corresponding to FIG. 2 according to a second embodiment.

FIG. 6 is a sectional view of a front body structure according to a second embodiment. The feature of the second embodiment is providing a hood sealing member 25 made of elastic member like rubber having a hollow section inside thereof on the second convex section 23c of the hood inner panel 23. When an impact energy is applied from above, since a part of impact energy is absorbed by the deformation of the hood sealing member 25, further reduction of HIC value can be expected.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A front body structure of a vehicle having a front wheel apron constituting a side wall of an engine room and an upper surface connected with a front fender through a supporting bracket extending in a lengthwise direction of a vehicle, said supporting bracket comprising:

an upper mounting surface on which said front fender is mounted;

an engine room side vertical wall downwardly extending from a widthwise inner edge of said upper mounting surface;

a front fender side vertical wall downwardly extending from a widthwise outer edge of said upper mounting surface; and an impact absorbing means provided on said front fender side vertical wall for absorbing an impact from above.

2. The front body structure according to claim 1, wherein said impact absorbing means includes an arch-shaped flange section and at least one hole section provided in the vicinity of a connecting portion of said supporting bracket and said upper surface of said front wheel apron.

3. The front body structure according to claim 1, further comprising:

an engine hood outer panel;

an engine hood inner panel forming a hut-shaped closed cross section with said engine hood outer panel;

a first convex section provided along said hut-shaped engine hood inner panel;

a second convex section provided adjacent to and outside of said first convex section along said hut-shaped engine hood inner panel; and a fold line section provided on said hut-shaped engine hood inner panel in a lengthwise direction of said vehicle between said first convex section and said second convex section so that said engine hood inner panel is easily bent around said fold line toward said engine hood outer panel when an impact load is applied to said engine hood outer panel.

4. The front body structure according to claim 3, wherein said fold line section is located inside of an extension line of a surface of said engine room side vertical wall when viewed from a longitudinal direction of said vehicle.

5. The front body structure according to claim 3, wherein said fold line section is located on an extension line of a surface of said engine room side vertical wall when viewed from a longitudinal direction of said vehicle.

6. The front body structure according to claim 3, further comprising:

an elastic member provided on said second convex section so as to absorb a part of impact load.

\* \* \* \* \*